United States Patent [19]
Ohkawa et al.

[11] Patent Number: 4,927,287
[45] Date of Patent: May 22, 1990

[54] FASTENER FOR FASTENING PLATES TOGETHER

[75] Inventors: Toshiya Ohkawa, Nagayo; Hiromichi Nakayama; Tatsuya Iguchi, both of Toyota, all of Japan

[73] Assignee: NIFCO, Inc., Yokohama, Japan

[21] Appl. No.: 368,759

[22] Filed: Jun. 20, 1989

[30] Foreign Application Priority Data

Jun. 28, 1988 [JP] Japan ................................ 63-158201

[51] Int. Cl.$^5$ ............................................. F16B 13/06
[52] U.S. Cl. ................................. 403/408.1; 24/297; 24/458; 411/41; 411/510; 411/21
[58] Field of Search ................ 403/405.1, 406.1, 408.1; 411/40, 41, 21, 508, 509, 510, 913, 182, 57, 60; 24/292, 297, 458

[56] References Cited

U.S. PATENT DOCUMENTS

| | | | |
|---|---|---|---|
| 3,139,768 | 12/1961 | Biesecker | 411/508 X |
| 3,918,130 | 11/1975 | Poe | 411/41 X |
| 3,988,808 | 11/1976 | Poe et al. | 411/509 X |
| 4,276,806 | 7/1981 | Morel | 411/41 |
| 4,624,585 | 11/1986 | Nix et al. | 411/509 X |
| 4,729,606 | 3/1988 | Narita et al. | 24/297 X |
| 4,749,318 | 6/1988 | Bredal | 411/508 X |
| 4,757,664 | 7/1988 | Freissle | 403/408.1 X |
| 4,821,381 | 4/1989 | Kaneko et al. | 411/41 X |

*Primary Examiner*—Randolph A. Reese
*Assistant Examiner*—Carol I. Bordas
*Attorney, Agent, or Firm*—Schwartz & Weinrieb

[57] ABSTRACT

A fastener includes a female body and male body. By forcibly inserting the male body into a male body insertion hole of the female body, the two bodies are temporarily coupled together. By further inserting the male body into the female body from this state, leg portions of the female body are caused to flare outwardly so that overlapped plates are fastened together between the flared leg portions and a head portion of the female body. By further inserting the male body into the female body from this state, the leg portions are released from the flared state, so that the plates can be unfastened. When and only when the leg portions are inserted through a hole of a plate to be fastened by means of the fastener disposed in the temporarily coupled state, can the male body be further inserted within the female body so as to fasten the two plates to each other.

13 Claims, 7 Drawing Sheets

FASTENER FOR FASTENING PLATES TOGETHER

BACKGROUND OF THE INVENTION

1. Field of the Invention

This invention relates to a fastener for fastening together a plate-like base and a plate-like mounting piece of a component in an overlapped state, such as, for example, when securing a component to a car body. More specifically, the invention concerns a so-called one-way push type fastener which comprises a female body having a plurality of leg portions capable of being flared outwardly and a male body to be inserted into an insertion hole of the female body, and in which the male body is coupled to the female body by forcibly inserting it into the insertion hole of the female body, and wherein the male body can be further inserted so as to cause outward flaring of the leg portions of the female body so as to couple together a pair of overlapped plates between the flared leg portions and a head portion of the female body and then, wherein further, the male body can be inserted further into the female body so as to release the flaring of the leg portions of the female body and thereby permit unfastening of the plates.

2. Description of the Prior Art

A one-way push type fastener of the aforenoted type is disclosed in Japanese Patent Publication No. 48-13144. When fastening plates together with this fastener, it is necessary to insert the leg portions of the female body through aligned hole of the overlapped plates and, in this state, push in the male body. Therefore, when fastening a plate to the lower surface of a horizontally secured plate, it is necessary to hold the plate to be fastened at a fixed position so as to align the holes of the two plates, insert the fastener through the holes in this state and then push in the male body so as to effect fastening of the plates to each other.

Substantially the same operation is necessary in the case where a plate is fastened to a vertically secured plate. In either case, a plurality of operations are necessary.

In order to simplify the operation when fastening plates together, the practice has been to temporarily couple the female body, with which the male body has been temporarily coupled to the first plate, by passing the female body through a hole of the first plate and then inserting an end portion of the female body projecting from the hole of the plate into a hole of the other plate so that the holes of the two plates are penetrated by means of the female body. Subsequently, the male body is pushed into the female body so as to effect final fastening of the plates to each other.

This method involving the temporary coupling of the fastener body members has an advantage in that there is no need to support the female body so as to prevent the female body from being detached from the penetrated holes of the plates until the male body is pushed into the female body so as to effect the fastening of the plates together. This method, however, has a disadvantage in that the male body is in a state with its head projecting from the female body as to be liable to be erroneously pushed into the female body before effecting the fastening of the plates.

More particularly, when the fastener is in the temporarily coupled state, the leg portions can be readily moved to the flared state. Therefore, the male body can be pushed into the female body with a small force so as to cause flaring of the leg portions. In actual practice, the fastener cannot be inserted through the hole of the plate to be fastened to another plate, and this entails a rather cumbersome operation.

OBJECTS OF THE INVENTION

The invention seeks to solve the above problems in connection with a fastener for fastening plates together by assembling the female and male bodies and then causing flaring of the leg portions of the female body by pushing the male body into the female body. More specifically, an object of the invention is to provide a fastener which is provided with male body restraint means and restraint releasing means so as to eliminate the inconvenience resulting from the erroneous insertion of the male body, and in which when the female body is inserted through and temporarily coupled to a hole of a plate to be fastened, the male body is restrained against movement so as to prevent the male body from being erroneously pushed further into the female body and thereby result in premature flaring of the leg portions of the female body by means of an unexpected external force, and when and only when the female body is inserted through a hole of another plate is the male body released from the restrained position so as to be pushed into the female body and thereby cause flaring of the leg portions of the female body so as to effect fastening of the plates to each other.

SUMMARY OF THE INVENTION

In order to attain the above object of the invention, there is provided a fastener comprising a female body to be inserted through aligned holes formed within overlapped plates and a male body for causing flaring of leg portions of the female body, the female body having a head portion for engaging a plate surface portion surrounding one of the holes, a plurality of circumferentially spaced-apart leg portions depending from the head portion and each having an inner projection projecting from the lower free end thereof and an axially central male body insertion hole penetrating the head portion and extending through the center of the leg portions, the male body having a pin-like portion having a sufficient length so as to penetrate the entire length of the insertion hole of the female body, the pin-like portion having an axially intermediate large-diameter portion having a diameter not greater than the diameter of the insertion hole and first and second small-diameter portions separated by means of the large-diameter portion, the male body further having a plurality of elastic engagement pieces extending obliquely upwardly and outwardly from the lower end of the pin-like portion, the fastener being capable of changing its state between a first state in which the male body is temporarily coupled to the female body by inserting the male body into the insertion hole of the female body such that the inner projections of the leg portions abut the first small-diameter portion of the male body and the elastic engagement pieces project outwardly through gaps defined between adjacent leg portions, a second state in which the leg portions are flared outwardly as a result of the abutment of the inner projections of the female body leg portions with the large-diameter portion of the male body, and a third state in which the leg portions of the female body are brought closer to one another with the inner projections brought into abutment with the second small-diameter portion of the male body, the female and male bodies being provided with respective stopper means which engage with each other in the first state so as to prevent a change in the status of the fastener from the first state to the second state, and the female or male body being further provided with releasing means for releasing the engagement between the stopper means when the leg portions of the female body are inserted through a hole of a second plate to be fastened to the first plate.

Since the fastener according to the invention has stopper means for preventing a change in the status of the fastener from the first state to the second state so as to permit further insertion of the male body within the female body when the leg portions of the female body are inserted through a hole of a plate to be fastened to the first plate and thereby achieve fastening of the plates together, it is possible to prevent premature flaring of the leg portions of the female body which might otherwise be caused by inadvertent further insertion of the male body into the female body while the male body is disposed in a state temporarily coupling the same to the female body. Thus, it is possible to provide a highly reliable fastener, which can eliminate reduction in the efficiency thereof due to erroneous or premature operation thereof.

BRIEF DESCRIPTION OF THE DRAWINGS

The above and other objects and feature of the invention will become more apparent from the following detailed description with reference to the accompanying drawings, in which like reference characters designate like or corresponding parts throughout the several views, and wherein.

DETAILED DESCRIPTION OF THE PREFERRED EMBODIMENTS

FIGS. 1 to 7 show a first embodiment of the fastener according to the invention. The fastener comprises a female body 1 and a male body 7 to be inserted into an insertion hole 4 of the female body 1.

Figure 1:
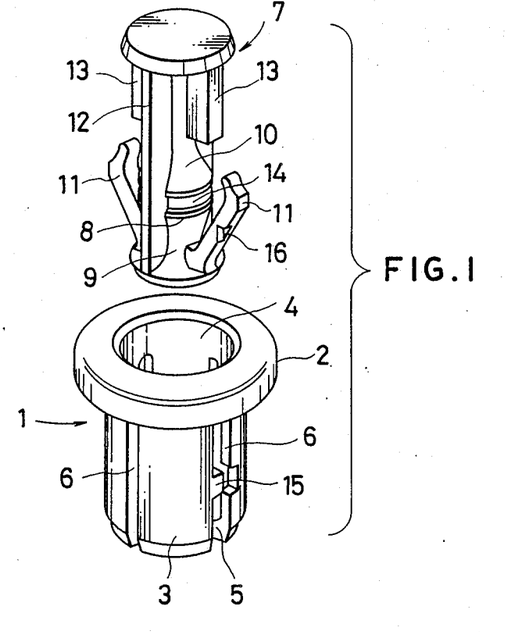
FIG. 1 is a perspective view showing a first embodiment of the fastener constructed according to the invention, with the female and male bodies separated from each other.

The female body 1 has a circular flange-like head portion 2 and four equiangularly circumferentially spaced-apart leg portions 3 depending from the head portion 2. The insertion hole 4 axially penetrates the female body 1. The four circumferentially spaced-apart leg portions 3 each have a free end portion which is provided with an inner projection 5 which extend radially inwardly so as to close the lower end of the insertion hole 4 in cooperation with the other projections 5. The leg portions 3 as a whole form a substantially cylindrical outer shape, and their free ends have a tapered surface. Slits 6 defined between adjacent ones of the leg portions 3 extend from the free ends of the leg portions to the lower surface of the head portion 2, and they have a width which permits passage therethrough of elastic engagement pieces 11 and short ridges 13 which will be described later.

The male body 7 is a pin-like member having sufficient length to penetrate the full-length of the insertion hole 4 of the female body 1. It has an axially intermediate large-diameter portion 8 and first and second small diameter portions 9 and 10 terminating in the respective lower and upper ends of the large-diameter portion 8. It also has a pair of diametrically opposed elastic engagement pieces 11 extending obliquely upwardly from its lower end. It further has a pair of diametrically opposed guide ridges 12 offset by 90° from the engagement pieces 11 and extending substantially over its entire length, and still yet further a pair of diametrically opposed short ridges 13 extending axially upon the outer periphery thereof and aligned with the respective elastic engagement pieces 11.

The large-diameter portion 8 has an outer diameter which is not greater than the diameter of the insertion hole 4. In this embodiment, the outer periphery of the large-diameter portion 8 has an annular engagement groove 14. The small-diameter portions 9 and 10 separated by means of the large-diameter portion 8 are radially recessed sufficiently so as to receive the inner projections 5 of the leg portions 3, and the leg portions 3 are maintained closed as a whole when the inner projections 5 are received within either one of the small-diameter portions 9 or 10. The elastic engagement portions 11 have their free ends extending outwardly to an extent which extends the diameter of the insertion hole 4 and each has an intermediate portion formed with a notch 16 within which a protuberance 15 of a corresponding leg portion 3 of the female body 1 can be received.

Figure 3:
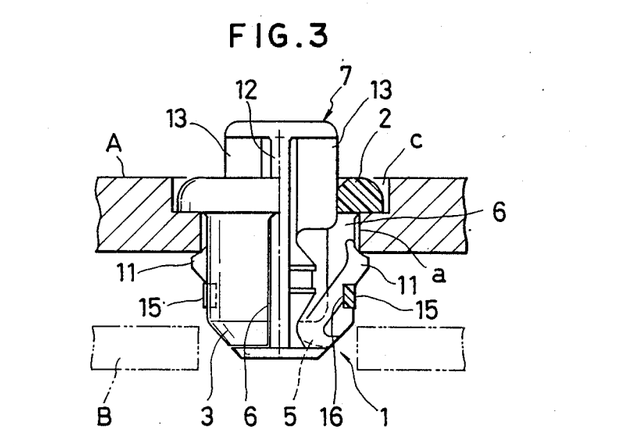
FIG. 3 is a front view, partly in section, showing the fastener of FIG. 1 inserted through and temporarily coupled within a hole of a first plate.

The protuberances 15 and notches 16 are adapted to engage one another when the male body 7 is temporarily coupled to the female body 1, and they serve as stopper means for restricting further axial movement of the male body 7 relative to the female body 1 (FIG. 3). This relation will be described later in detail in connection with the operation of coupling plates together as a result of the coupling of the female and male bodies 1 and 7 and the opening of the leg portions 3 as a whole by means of the male body 7.

Figure 2:
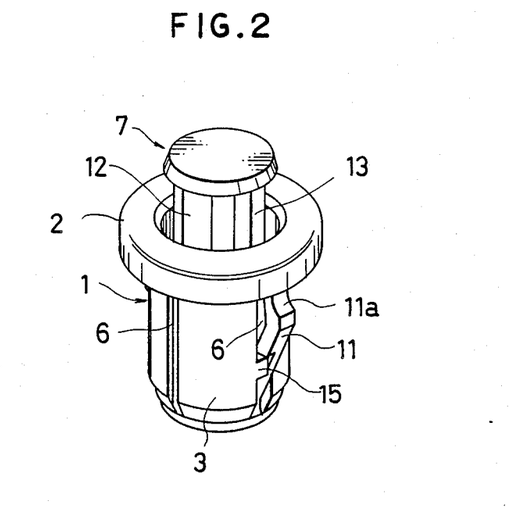
FIG. 2 is a perspective view showing the fastener of FIG. 1, with the female and male bodies coupled to each other.

The female and male bodies 1 and 7 of the fastener are separate moldings of a plastic material, particularly a thermoplastic material such as, for example, nylon having suitable rigidity and elasticity. They are coupled together in use. FIG. 2 shows the female and male bodies 1 and 7 coupled together. In order to couple the two bodies together, they are held so as to face each other in an end to end manner as shown in FIG. 1, and then the male body 7 is inserted downwardly into the insertion hole 4 of the female body 1 and pushed toward the coupled position at which an upper portion of the male body projects above the top of the head portion 2.

FIG. 3 is a front view, partly in section, showing the fastener in the coupled state as shown in FIG. 2. As is shown, the male body 7 is inserted until its lower end is substantially flush with the free ends of the leg portions 3. During this insertion operation, the outwardly flaring elastic engagement pieces 11 are initially brought closer to each other by means of the edge of the insertion hole 4. When they reach the slits 6, they restore to their initial state, that is, they extend outwardly through the slits 6 and face the bottom of the head portion 2. As a result, detachment of the fastener from the insertion hole 4 is prevented, that is, the fastener is coupled within the hole a of the plate A.

This coupling operation achieves a temporarily coupled state in which the female and male bodies 1 and 7 are joined together. The elastic engagement pieces 11, which were brought closer to each other as they pass through the upper portion of the insertion hole 4 as the same proceed from the head portion 2, restore to their initial state upon reaching the slits 6, with their free ends projecting outwardly therefrom. At the same time, the notches 16 provided upon intermediate portions of the elastic engagement pieces 11 are engaged with the protuberances 15 provided upon two of the four leg portions 3. As a result, the male body 7 is restricted against withdrawal and also against further movement in the insertion direction. That is, it is maintained at a temporarily coupled state. In this state the guide ridges 12 and short ridges 13 are disposed within the slits 6 so as to guide the male body 7 along the female body 1.

In FIG. 3, this temporarily coupled fastener is inserted within the hole a of the plate A and thereby coupled to the plate A.

Two plates A and B to be fastened to each other are formed with respective holes a and b having a substantially equal diameter such that the leg portions 3 of the female body 1 can be inserted through these holes. Furthermore, the plate A is formed with a recess C for receiving the head portion 2 of the female body 1.

When the temporarily coupled fastener is inserted through the hole a, the elastic engagement pieces 11 projecting outwardly from the leg portions 3 are flexed inwardly, and they are subsequently restored outwardly so as to engage the lower end of the hole a and cooperate with the head portion 2 in order to couple the fastener to the plate A.

The coupled fastener is maintained in this state until the two plates are fastened together. The fastener coupled to the plate A is maintained in the temporarily coupled state without having any force applied thereto and even when the upper end of the male body 7 projecting above the head portion 2 is pushed downwardly because of the engagement between the notches 16 of the elastic engagement pieces 11 and the protuberances 15 of the leg portions 3.

Figure 4:
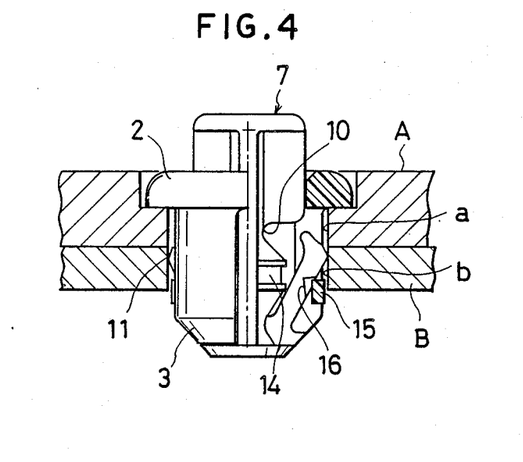
FIG. 4 is a front view, partly in section, showing the fastener inserted through and temporarily coupled within holes of two plates.
Figure 5:
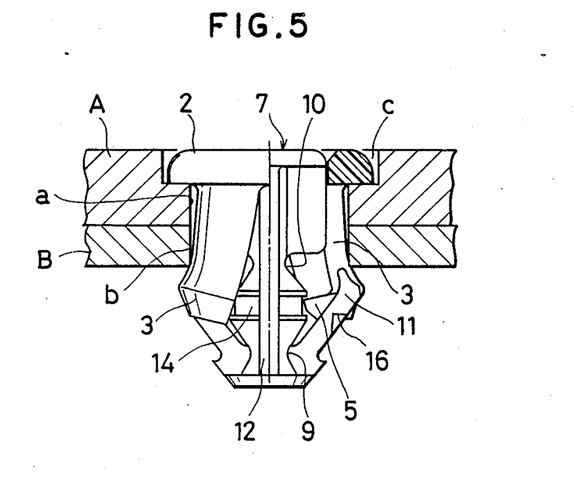
FIG. 5 is a front view, partly in section, showing the fastener having fastened the two plates together, with the female body flared outwardly as a result of the insertion therein of the male body.

FIGS. 4 and 5 have been provided for explaining the fastening of the plates A and B to each other. The fastener coupled within the hole a of the plate A is maintained such that it faces the hole b of the plate B, and in this state the leg portions 3 are inserted through the hole b. As a result, the free ends of the elastic engagement pieces 11 are urged by means of the inner sidewall surface of the hole b radially inwardly into the slits 6, thus disengaging the protuberances 15 from the notches 16 so as to release the fastener from the restricted state to the released state shown in FIG. 4.

Thus, when the leg portions 3 of the fastener constructed according to the invention are inserted into the hole b of plate B, it is possible to insert the male body 7 axially further into female body 1. Thus, the inner projections 5 of the leg portions 3, which have been disposed within the first small-diameter portion 9, are brought into engagement with the large-diameter portion 8, thus causing the free ends of the leg portions 3 to flare radially outwardly beneath the plate B and cooperate with the head portion 2 so as to fasten the intervening plates A and B to each other (FIG. 5). At this time, the upper end of the male body 7 is flush with the top of the head portion 2, and the inner projections 5 are received within the annular engagement groove 14 formed within the large-diameter portion 8 so as to maintain the male body 7 at a stable pushed-in position.

Figure 6:
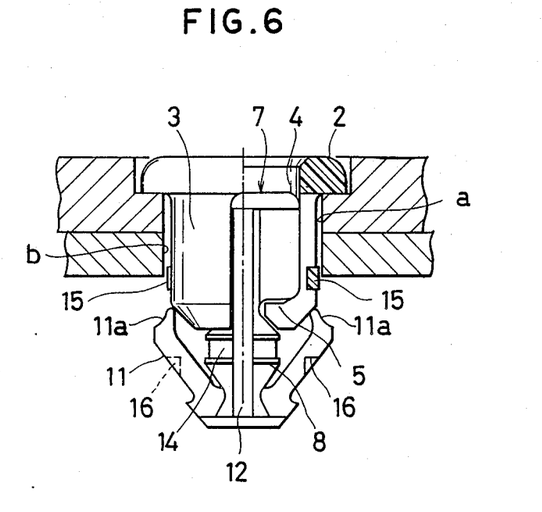
FIG. 6 is a front view, partly in section, showing the fastener with the female body contracted as a result of further insertion therein of the male body.
Figure 7:
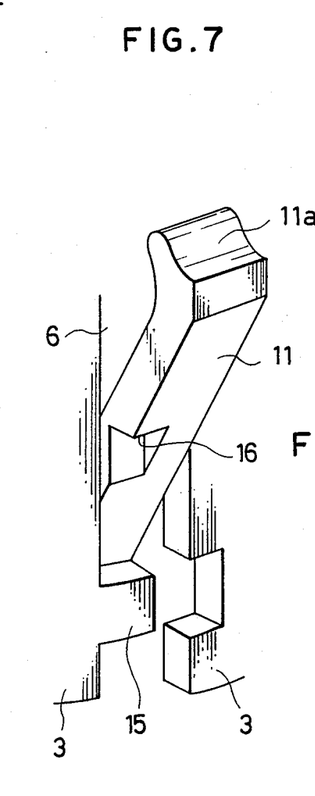
FIG. 7 is a fragmentary enlarged perspective view showing the fastener of FIG. 1.

FIG. 6 shows the fastener in a state released from the state of fastening the two plates together as shown in FIG. 5. In order to release the fastener from the state shown in FIG. 5 to that shown in FIG. 6, the upper end of the male body 7 is axially forced further into the insertion hole 4 by means of a suitable tool. As a result, the inner projections 5 are released from the groove 14 and brought into the region of the second small-diameter portion 10. At this time, the leg portions 3 move radially inwardly and closer to one another. As a result, the fastener can be withdrawn from the holes b and a so as to unfasten the plates A and B from each other. The free end of each elastic engagement piece 11 is formed with a gently inclined surface 11a. With these gently inclined outer surfaces 11a serving as guides, the flared elastic engagement pieces 11 can be withdrawn from the holes b and a.

FIGS. 8 to 13 show a second embodiment of the invention. In this embodiment, the stopper means provided upon the male body 7 for effecting the temporary coupling comprise independent engagement arms 17. The leg portions 3 are provided with receiving sections 18 for receiving the engagement arms 17 and also with releasing portions 19 facing the receiving sections 18. In this embodiment, parts not included in the first embodiment are designated by independent reference numerals and will be described, while the other parts similar to those of the first embodiment are designated by like reference numerals and will not be described.

Figure 8:
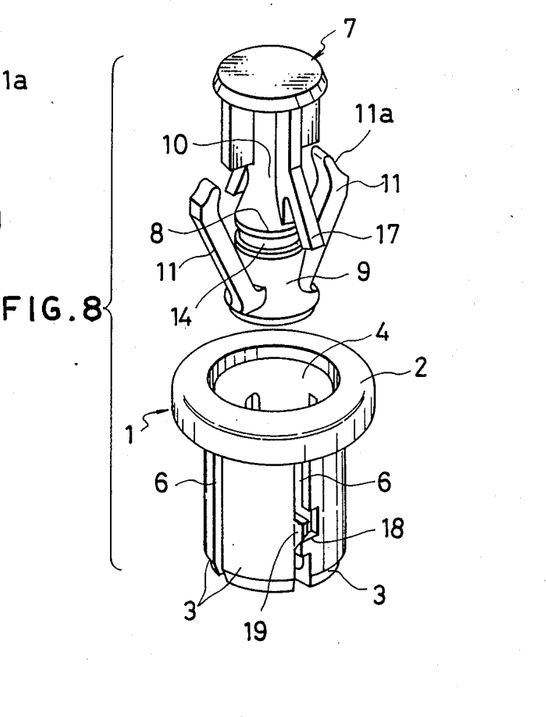
FIG. 8 is a perspective view showing a second embodiment of the fastener constructed according to the invention, with the female and male bodies separated from each other.
Figure 9:
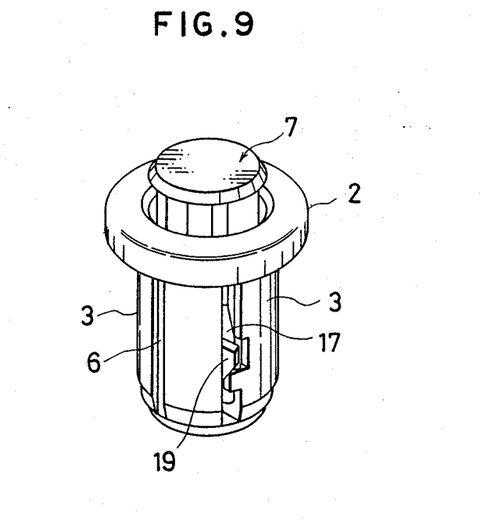
FIG. 9 is a perspective view showing the fastener of FIG. 8, with the female and male bodies coupled to each other.
Figure 10:
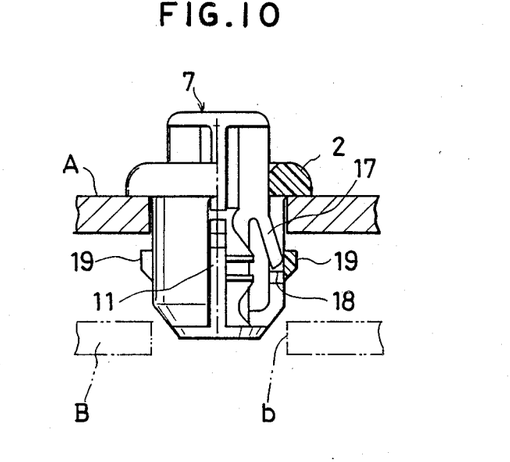
FIG. 10 is a front view, partly in section, showing the fastener of FIG. 8 inserted through and temporarily coupled within a hole of a first plate.

The engagement arms 17 extend downwardly and obliquely downwardly from an axially intermediate portion of the male body 7 and are provided with suitable elasticity and flexibility. On the other hand, the receiving sections 18 are each formed by cutting an edge portion of the corresponding leg portion 3. Each releasing portion 19 is provided so as to project from that edge portion of each leg portion 3 which faces the receiving the section 18 of an adjacent leg portion 3 upon the opposite side of the slit 6. Each releasing portion 19 projects obliquely outwardly from the outer surface of the leg portion 3 and has a lower inclined end portion.

When assembling the fastener in accordance with this embodiment, the lower end of the male body 7 is inserted into the insertion hole 4, and is forced downwardly so that the elastic engagement pieces 11 are brought closer to each other. When the engagement arms 17 reach the insertion hole 4, they are inserted thereinto by contracting them radially inwardly by means of one's fingers.

As the male body 7 is inserted, the elastic engagement pieces 11 restore to their initial state so as to project outwardly through slits 6 defined between adjacent leg portions. As the engagement arms 17 move within the remaining slits 6, they flare outwardly and strike the receiving sections 18 so as to stop the insertion of the male body 7. At this time, the inner projections 5 of the leg portions 3 are received within the first small-diameter portion 9 of the male body 7, whereby a temporarily coupled state is obtained.

Figure 11:
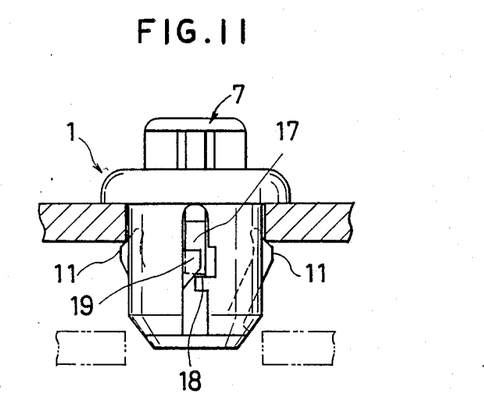
FIG. 11 is a side view showing the fastener of FIG. 10.

The fastener which is thus temporarily coupled is inserted through the hole a of the plate A and temporarily coupled to the plate A, as shown in FIG. 11, in the same manner as in the first embodiment. In this state, the male body is maintained with its upper end portion projecting upwardly above the top surface of female body 1 and is restricted against further insertion by means of the engagement between the engagement arms 17 and the receiving sections 18. Thus, the fastener temporarily coupled to the plate A is safe from detachment from the hole a. Also, in this state the leg portions 3 are not flared outwardly as a result of such insertion of the male body.

Figure 12:
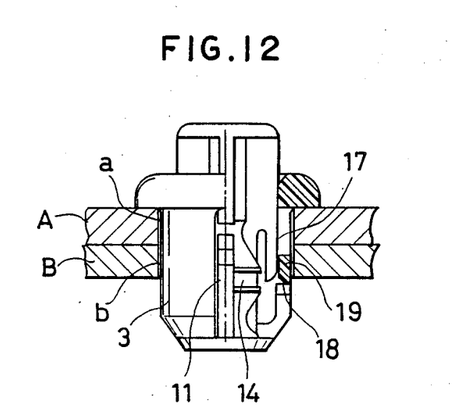
FIG. 12 is a front view, partly in section, showing the fastener of FIG. 8 having fastened two plates together.
Figure 13:
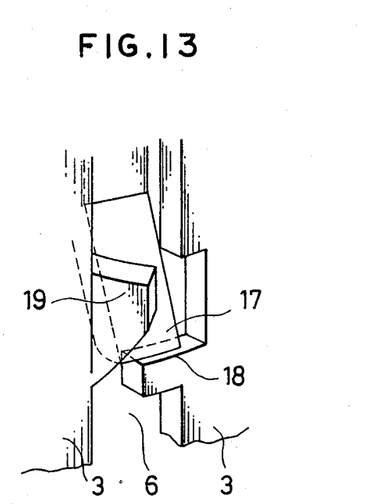
FIG. 13 is a fragmentary enlarged perspective view showing the fastener constructed of FIG. 8.

Subsequently, the plate B is fastened to the plate by inserting the ends of the leg portions 3 of the female body 1 through hole At this time, the releasing portions 19 are engaged by means of the sidewall surface of the hole b. As a result of such engagement, the engagement arms 17 engaged at their outer surfaces and flexed inwardly. As a result, the engagement arms 17 are detached from the receiving sections 18 so as to release the restraint as seen in FIG. 12.

Thus, after overlapping the plates A and B by inserting the leg portion ends through the holes b and a, and by forcibly inserting the male body 7 into the insertion hole 4, the leg portions 3 biased radially outwardly from one another by means of the large-diameter portion 8 so as to engage with the surface of the hole b, thus effecting the fastening of the two plates to each other.

While the illustrated embodiments of the invention have been described, according to the invention, by temporarily coupling together the female and male bodies, further insertion of the male body is restricted by the engagement of stopper means, that is, the protuberances and notches or engagement arms and receiving sections, provided upon the two bodies, thus preventing accidental flaring of the leg portions. Thus, when the upper portion of the male body is accidentally pushed axially inwardly, there is no possibility of causing erroneous flaring of the fastener so that insertion of the fastener through a hole of one of the two plates is prevented. Also, there is no possibility of prematurely flaring of the fastener so as to obstruct insertion thereof through a hole of the other plate. It is thus possible to effect fastening of plates quickly and properly.

According to the invention, even when the fastener is temporarily coupled in advance to one of two plates to be fastened together, since further axial insertion of the male body is prevented until the actual fastening operation has been completed with respect to both plates, there is no possibility of erroneous flaring of the leg portions during transport of the fastener, which is very advantageous for the mounting of components. In addition, the reliability of the temporary coupling is improved, which is very advantageous in that operability is enhanced in the case of wherein it is desired to secure components at a location under inferior operating conditions such as, for example, in a narrow place or securing a component to an upper or remotely located part.

Obviously, many modifications and variations of the present invention are possible in light of the above teachings. It is therefore to be understood that within the scope of the appended claims, the present invention may be practiced otherwise than as specifically described herein.

What is claimed is:

1. A fastener, comprising:
   a female body to be inserted through aligned first and second holes formed within overlapped first and second plates to be fastened together; and
   a male body for causing flaring of said female body,
   said female body having a head portion for engaging a plate surface portion surrounding said first one of said holes defined within said first plate, a plurality of circumferentially spaced-apart leg portions depending from said head portion and each having an inner projection projecting from a lower free end portion and an axially central male body insertion hole penetrating said head portion and extending axially centrally between said leg portions,
   said male body having a pin-like portion having sufficient length so as to penetrate the entire length of said insertion hole, said pin-like portion having an axially intermediate large-diameter portion having a diameter not greater than the diameter of said insertion hole of said female body and first and second small-diameter portions separated by means of said large-diameter portion, said male body further having a plurality of elastic engagement pieces extending obliquely upwardly and outwardly from a lower end portion of said pin-like portion,
   said fastener being capable of changing its state between a first state in which said male body is temporarily coupled to said female body by inserting said male body into said insertion hole of said female body such that said inner projections of said leg portions of said female body abut said first small-diameter portion of said male body and said elastic engagement pieces project outwardly through gaps defined between adjacent leg portions of said female body, a second state in which said leg portions of said female body are flared outwardly as a result of abutment of said inner projections of said leg portions of said female body with said large-diameter portion of said male body, and a third state in which said leg portions of said female body are brought closer to one another as a result of said inner projections of said leg portions of said female body being brought into abutment with said second small-diameter portion of said male body,
   said female and male bodies being provided with respective stopper means which engage each other in said first state so as to prevent any change of said fastener from said first state to said second state, one of said female and male bodies being further provided with releasing means for releasing said engagement between said stopper means when said leg portions of said female body are inserted through said second one of said holes defined within said second plate to be fastened to said first plate.

2. A fastener according to claim 1, wherein said stopper means on said male body is constituted by notches formed in longitudinally intermediate portions of said elastic engagement pieces projecting outwardly through gaps between adjacent leg portions, and said stopper means on said female body is constituted by protuberances formed on said leg portions, past which said elastic engagement pieces project.

3. The fastener according to claim 1, wherein said stopper means on said male body consists of engagement arms extending obliquely downwardly from an axially upper or intermediate portion of said pin-like portion, and said stopper means on female body is constituted by receiving sections formed in said leg portions.

4. The fastener according to claim 1, wherein:
said releasing means is constituted by the free ends of said elastic engagement pieces of said male body projecting outwardly from said leg portions of said female body.

5. The fastener according to claim 1, wherein said releasing means is constituted by releasing portions formed on said leg portions of said female body.

6. The fastener as set forth in claim 3, wherein:
said releasing means comprises releasing portions formed upon said leg portions of said female body for engaging said downwardly extending engagement arms of said male body.

7. The fastener as set forth in claim 1, wherein:
said female and male bodies comprise plastic molded components.

8. The fastener as set forth in claim 1, wherein:
said plurality of leg portions of said female body comprises four leg portions.

9. The fastener as set forth in claim 1, wherein:
said plurality of elastic engagement pieces of said male body comprises a pair of diametrically opposed engagement pieces.

10. The fastener as set forth in claim 3, wherein:
said engagement arms of said male body comprises a pair of diametrically opposed engagement arms disposed within a first plane and
said plurality of engagement pieces of said male body comprises a pair of diametrically opposed engagement pieces disposed within a second plane which is disposed perpendicular to said first plane within which said engagement arms are disposed.

11. The fastener as set forth in claim 9, further comprising:
axially extending gap means defined between adjacent ones of said leg portions of said female body; and
axially extending guide ridges defined upon said male body for axial movement within said axially extending gap means of said female body so as to guide said male body when said male body is inserted within said female body.

12. The fastener as set forth in claim 11, wherein:
said pair of diametrically opposed engagement pieces are disposed within a first plane; and
said axially extending guide ridges comprises two pairs of guide ridges, a first pair of said guide ridges having a length substantially equal to the length of said pin-like portion of said male body and being diametrically opposed with respect to each other within a second plane disposed perpendicular to said first plane of said engagement pieces, and a second pair of said guide ridges being diametrically opposed with respect to each other within said first plane of said engagement pieces and at an elevation above said engagement pieces.

13. The fastener as set forth in claim 10, further comprising:
axially extending gap means defined between adjacent ones of said leg portions of said female body; and
two pairs of diametrically opposed axially extending guide ridges defined upon said male body for axial movement within said axially extending gap means of said female body so as to guide said male body when said male body is inserted within said female body, a first one of said two pairs of guide ridges being disposed within said first plane above said engagement arms, and a second one of said two pairs of guide ridges being disposed within said second plane above said engagement pieces.

* * * * *